Figure 1:
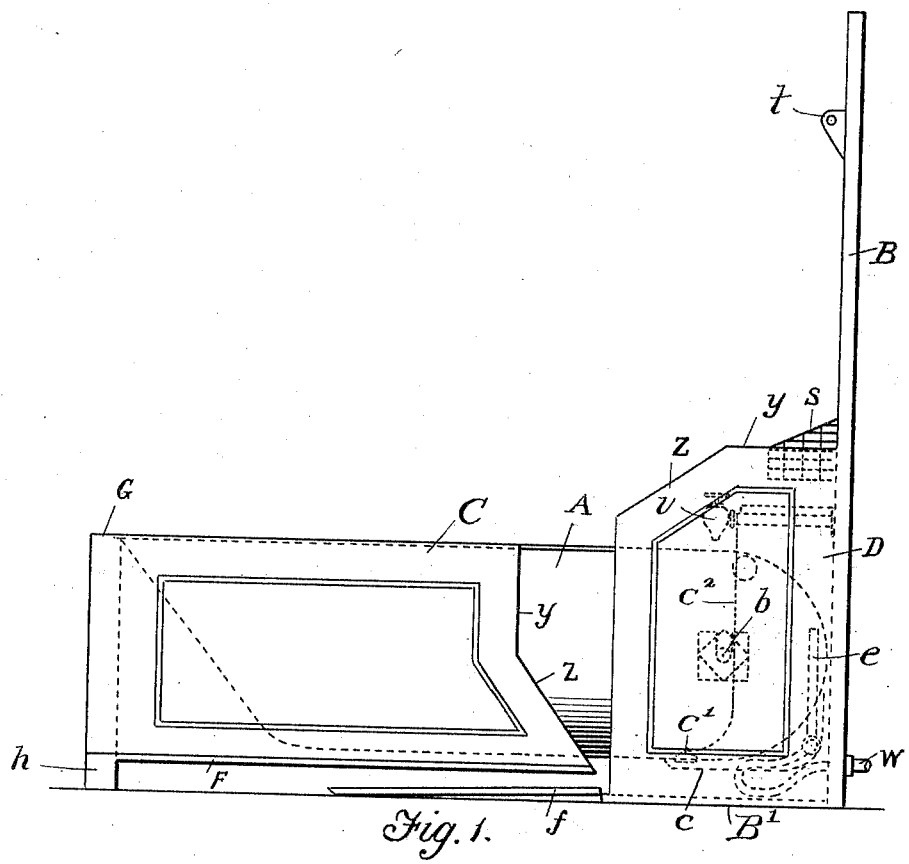

No. 760,540. PATENTED MAY 24, 1904.
E. W. LANCASTER.
BATH.
APPLICATION FILED FEB. 4, 1903.
NO MODEL.
6 SHEETS—SHEET 1.

Witnesses.

Inventor.
E. W. Lancaster
per T. E. Halford
attorney

No. 760,540. PATENTED MAY 24, 1904.
E. W. LANCASTER.
BATH.
APPLICATION FILED FEB. 4, 1903.
NO MODEL. 6 SHEETS—SHEET 2.

Witnesses.

Inventor.
E. W. Lancaster.
per J. E. Halford
Attorney

No. 760,540. PATENTED MAY 24, 1904.
E. W. LANCASTER.
BATH.
APPLICATION FILED FEB. 4, 1903.
NO MODEL. 6 SHEETS—SHEET 3.
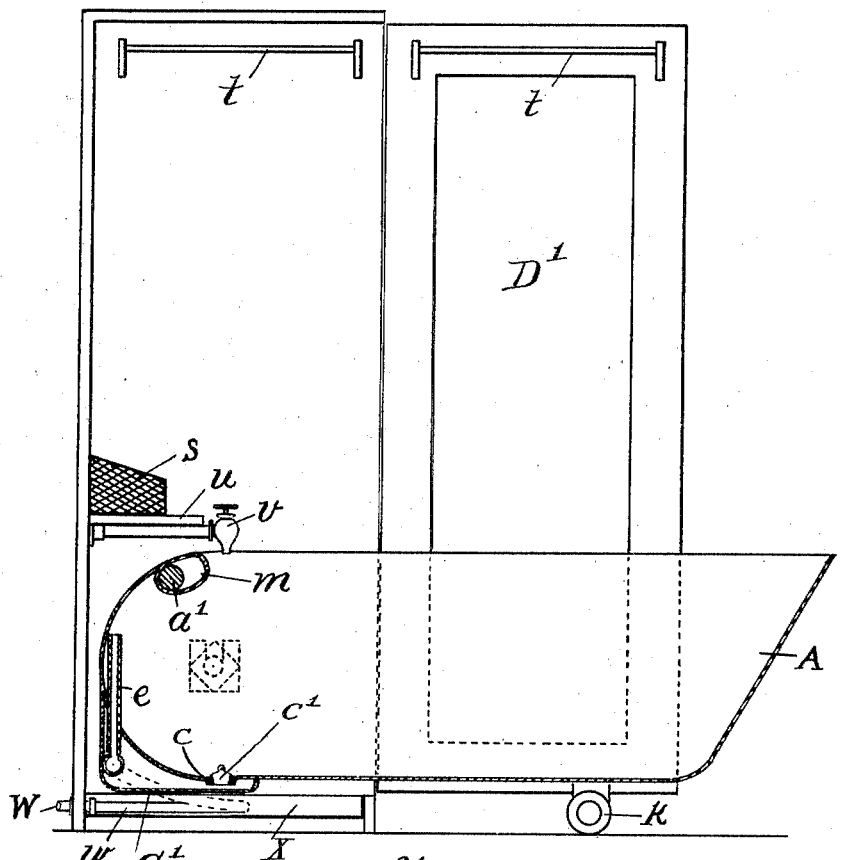
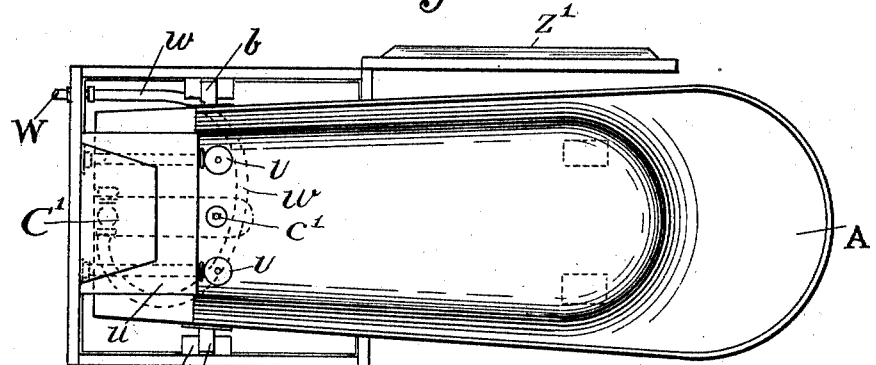
Witnesses. Inventor.
E. W. Lancaster
per T. E. Halford
attorney No. 760,540. PATENTED MAY 24, 1904.
E. W. LANCASTER.
BATH.
APPLICATION FILED FEB. 4, 1903.
NO MODEL. 6 SHEETS—SHEET 4.

Witnesses.
J. W. Dunham.
J. W. Newlin.

Inventor.
E. W. Lancaster
per T. E. Halford
Attorney

No. 760,540. PATENTED MAY 24, 1904.
E. W. LANCASTER.
BATH.
APPLICATION FILED FEB. 4, 1903.
NO MODEL. 6 SHEETS—SHEET 5.

Witnesses
G. W. Dunham
[signature]

Inventor.
E. W. Lancaster
per T. E. Halford
attorney

No. 760,540. PATENTED MAY 24, 1904.
E. W. LANCASTER.
BATH.
APPLICATION FILED FEB. 4, 1903.
NO MODEL. 6 SHEETS—SHEET 6.

Witnesses
Inventor
E. W. Lancaster
per J. E. Halford
Attorney

No. 760,540.                                                        Patented May 24, 1904.

UNITED STATES PATENT OFFICE.

EDWARD W. LANCASTER, OF WESTMINSTER, ENGLAND.

BATH.

SPECIFICATION forming part of Letters Patent No. 760,540, dated May 24, 1904.

Application filed February 4, 1903. Serial No. 141,928. (No model.)

*To all whom it may concern:*

Be it known that I, EDWARD WILLIAM LANCASTER, a subject of the King of Great Britain, residing at No. 28 Victoria street, Westminster, England, have invented certain new and useful Improvements in Baths, of which the following is a specification.

My invention relates to baths wherein the tub is pivotally connected with a cabinet in such manner that it may be elevated or turned up on end and inclosed within the cabinet when not in use and may as readily be lowered to a horizontal position when desired.

The object of my invention is to so construct and arrange a bath of this kind that the tub may be made to occupy as little space as possible outside the cabinet when lowered, may yet be of maximum length, and may be so connected with the waste-pipe as to discharge thereinto when the tub is in either a horizontal or a vertical position.

A further object of my invention is to so arrange the bath that the faucets or spigots may discharge or drip into the tub when the latter is in either position and that all water at any time entering the tub may be conveyed to the waste-pipe.

In carrying out my invention I provide a cabinet of any suitable construction for containing the tub and its fittings. The inner or rear end of the tub is curved and introverted, a pivotal connection being made between the inner end of the tub and the cabinet which is such that the tub may be turned about its pivots in such manner as to assume either an elevated or a horizontal position without abutting against the walls of the cabinet, while the inner or rear end of the tub when in a horizontal position is in close proximity to the rear wall of the cabinet, thus causing the tub to project from the cabinet to a minimum extent. Preferably counterbalancing devices are employed consisting either of a shifting weight or shifting springs, which facilitate in lowering and raising the tub and in holding the latter in the position to which it is adjusted. In order to drain the tub, I locate at its inner rear end a chamber which communicates with the ordinary waste-opening in the tub and also with an overflow-pipe. This chamber is in turn connected with a waste-pipe by flexible connections which permit of the tub being raised and lowered without breaking the connection to the waste-pipe. The cabinet is preferably equipped with the usual bath requisites—such as towel-racks, sponge-baskets, bath-mat, soap-dish, &c.—and preferably a mirror is attached to the outside of the door of the cabinet. This cabinet may be a plain vertical rectangular structure with a front door of approximately the same width and height as the body of the cabinet, or the cabinet may be made in folding sections, one section being fixed, while the other is carried by the tub and lowers with the latter when the tub is moved to its horizontal position.

My improvements are fully illustrated in the accompanying drawings.

Figure 3:
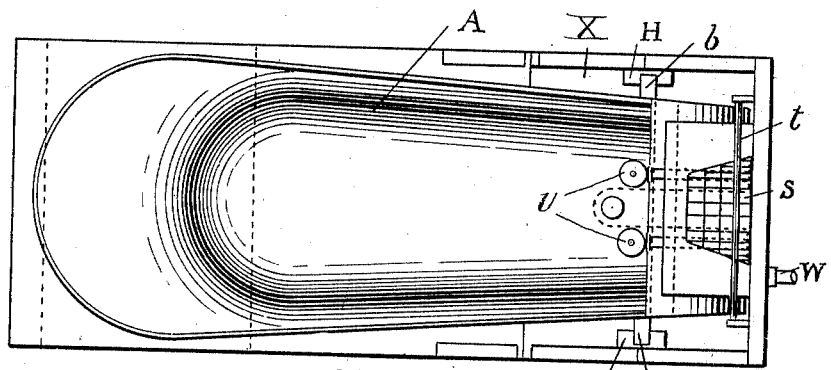
Figure 2:
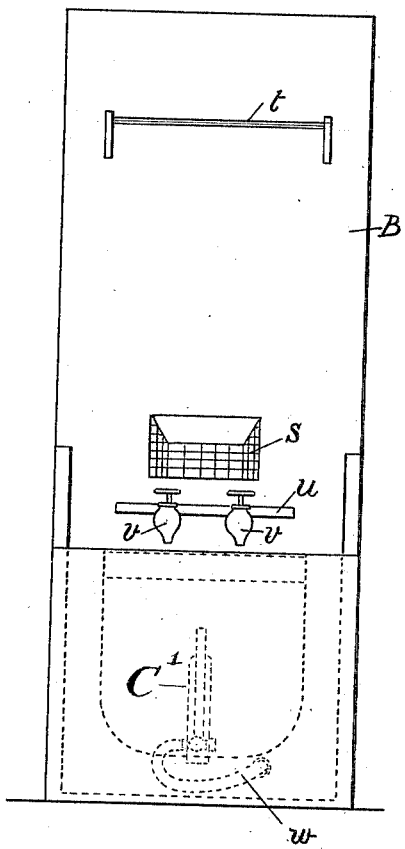
Figure 4:
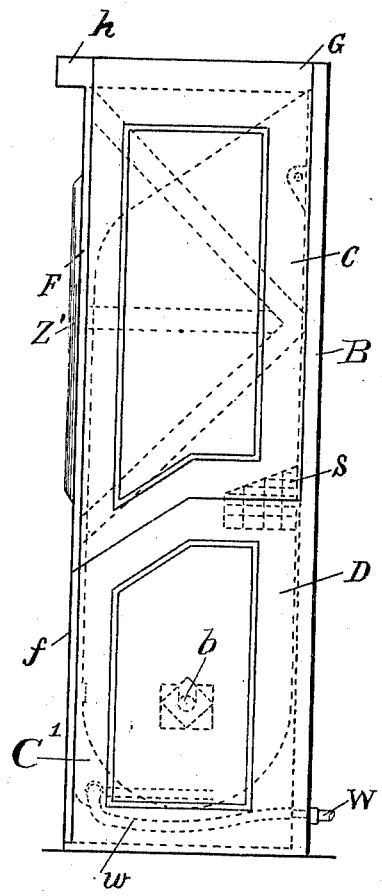
Figure 7:
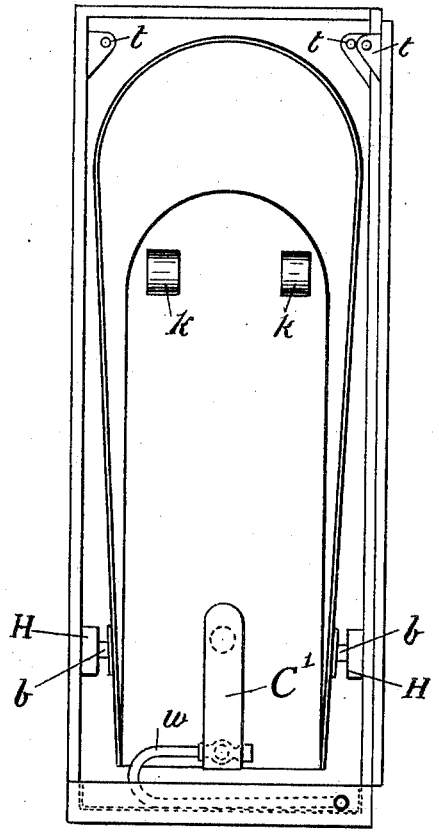
Figure 8:
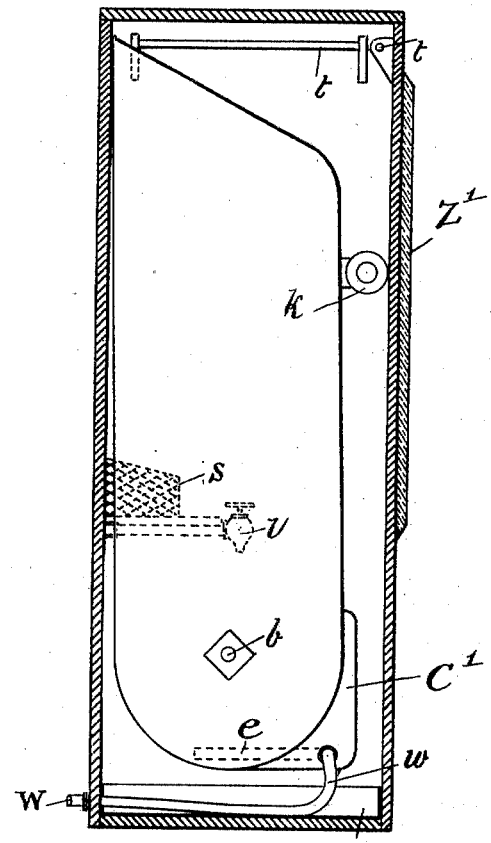
Figure 9:
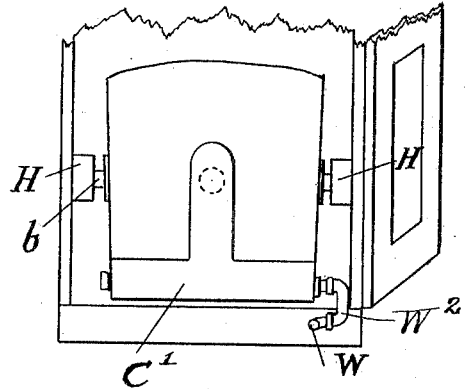
Figure 10:
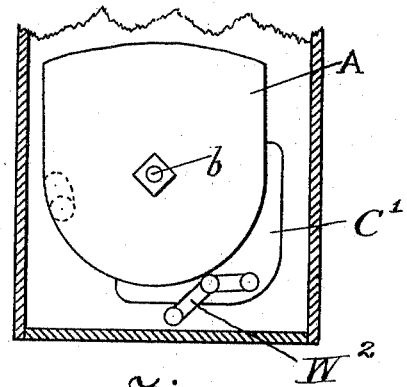
Figure 11:
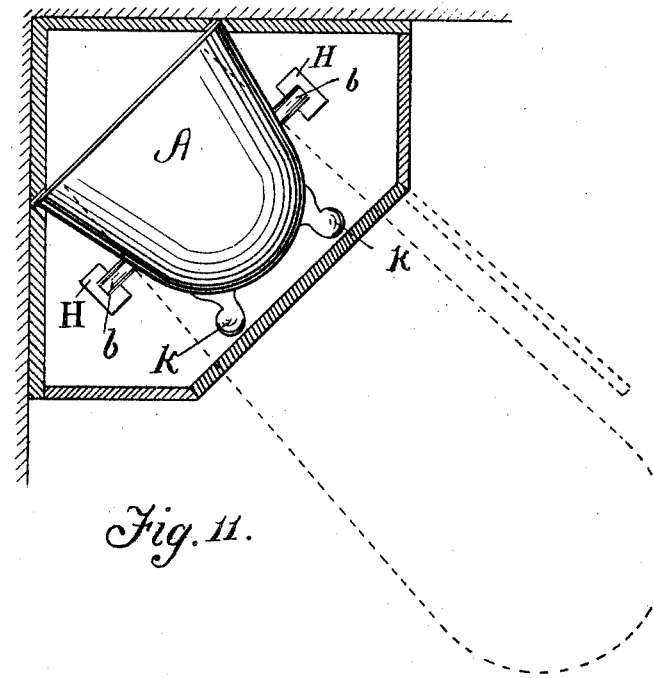
Figure 12:
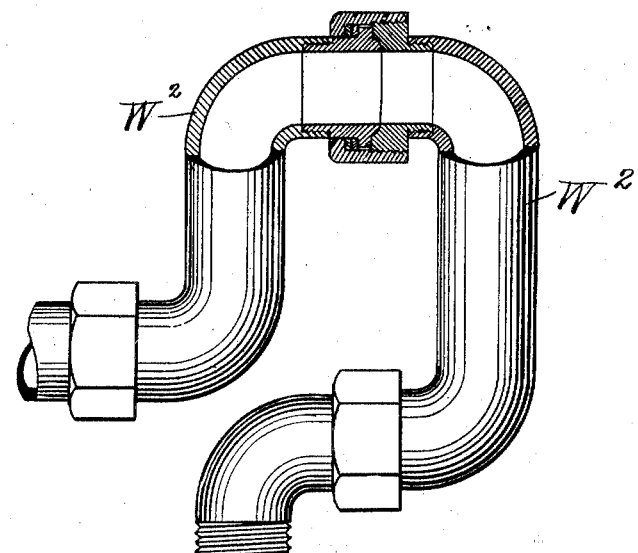
Figure 13:
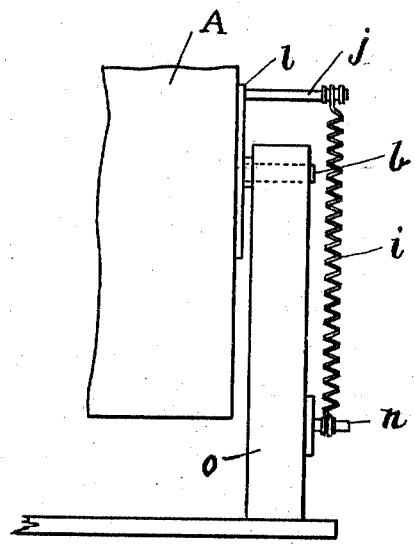
Figure 14:
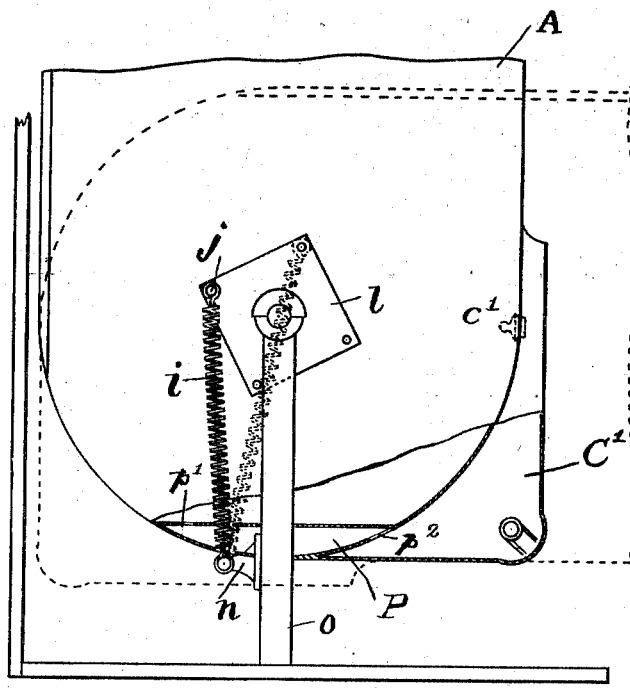

Figure 1 shows a side elevation of a bath constructed in accordance with my invention with the tub and part of the cabinet lowered. Fig. 2 shows a front elevation of the same with parts in the position shown in Fig. 1. Fig. 3 is a plan with the parts in the same position. Fig. 4 is a side elevation with the tub elevated and the cabinet closed. Fig. 5 shows a vertical section of a modified form of my invention, the front door of the cabinet being open and the tub lowered. Fig. 6 is a plan of the bath shown in Fig. 5 with the parts in the same position. Figs. 7 and 8 are respectively a front view and a vertical section of the tub and cabinet shown in Figs. 5 and 6, but with the tub elevated. In Fig. 7 the door is open, while in Fig. 8 it is closed. Figs. 9 and 10 are detail views showing a modified flexible connection between the tub and the waste-pipe. Fig. 11 shows a horizontal section of a cabinet adapted to be fitted in a corner or angle of a wall, the tub contained in the cabinet being shown in plan. Fig. 12 is a detail view, partly in elevation and partly in section, of a form of flexible connection which may be employed to connect the tub with the waste-pipe. Figs. 13 and 14 are detail views showing how the tub may be counterbalanced by the use of springs instead of a weight or weights.

So far as some features of my invention are concerned the precise form of the cabinet is unimportant. In some cases I prefer to construct the cabinet in the manner shown in Figs. 1 to 4, inclusive, in which case the cabinet consists of a stationary back B, to the lower end of which are attached side pieces D and a bottom piece B'. To the bottom piece at the front of the side pieces is hinged a front piece f. The upper portion of the cabinet consists of side pieces C, a top G, and a front F. This portion of the cabinet is securely attached to the tub A and is raised and lowered therewith. Projections or feet h are formed on or secured to the upper front end of the upper portion of the cabinet, and these rest on the floor of the room when the tub is lowered, as indicated in Fig. 1. Preferably the upper edges of the side pieces D are joined to the lower edges of the sides C on the horizontal lines y and the diagonal lines z, so that the cabinet may be raised and lowered easily and when raised may fit closely in the manner indicated in Fig. 4. Other forms of cabinet may be employed, as will be hereinafter explained.

The tub A is preferably stamped out of steel, aluminium, or other suitable material which combines strength with lightness. The inner or rear end of the tub is made semicircular, as shown in Fig. 1; but otherwise it is of the usual shape. This inner end is pivotally connected with the cabinet by means of trunnions b, resting in supports H, attached to the sides of the cabinet. These trunnions are placed in line with the center of the arc corresponding with the curved inner end of the tub. By this arrangement the end of the tub may be arranged close to the rear wall of the cabinet, and yet the tub may be turned freely in either direction. In this way when the bath is lowered it is made to project from the cabinet to the minimum extent. The inner end of the tub is introverted—that is, the upper portion of its inner end turns inward or forward, as more clearly illustrated in Fig. 5. By this arrangement when the tub is elevated any water which may drip from the faucets will be caught and retained or allowed to pass off through the drains. The faucets are indicated at v, and they are preferably arranged below a shelf u, which may support a soap-dish. Above this shelf there is a sponge-basket S, and towel-racks t may be secured at convenient places within the cabinet. A mirror Z' may be attached, if desired, to the front of the upper portion of the cabinet in the manner illustrated in Fig. 4. To the lower portion of the rear end of the tub A is attached a chamber C', which is connected, by means of a flexible pipe w, with the waste-pipe W. The special construction of this chamber is more clearly illustrated in Fig. 5 and will be hereinafter more fully explained; but it is clear from inspection of Figs. 1 to 4 that the tub may be raised and lowered, and yet the connection with the waste-pipe W may be always preserved by means of the flexible pipe w. The tub communicates with the chamber C' through a waste-opening c, which may be closed by a stopper c', connected, by means of a chain $c^2$, with the bracket u, and I may employ an overflow-pipe e. (Shown in dotted lines in Fig. 1 and more clearly illustrated in Fig. 5.)

In Figs. 5 to 8, inclusive, I have shown a modification in which the cabinet is not made in sections in the manner illustrated in Fig. 1, but wherein the back and sides are complete from top to bottom and are stationary. The door D' extends from top to bottom of the cabinet, and the mirror Z' may be attached to the front of this door. The introverted end of the tub is shown as being formed with a transverse tubular portion m, within which is arranged a shifting weight a'. This may be merely a metallic cylinder or rod, or other suitable shifting weight may be used. When the tub is being raised, the weight assists in bringing it to its vertical position and holding it there. Instead of employing a shifting weight I may use springs in the manner indicated in Figs. 13 and 14, in which case the trunnions b are shown as projecting from flat plates l, secured to the tub and resting in posts O. From one of the corners of each of the plates l projects a rod j, to which is connected one end of a helical spring i, the opposite end of which is connected with a bracket n, fixed to the support O. It is obvious that if the devices shown in Figs. 13 and 14 are employed on opposite sides of the tub the weight of the tub will be to some extent counterbalanced and the raising and lowering thereof will be materially facilitated. The chamber C', before referred to and clearly shown in Figs. 5 and 7, is preferably made somewhat triangular in shape and comparatively narrow. It communicates with the tub through a waste-opening c, closed by a stopper c', and it also connects with an overflow-pipe e. This chamber is connected with the waste-pipe W by a flexible pipe w, as before described, the particular manner in which the connection is made being unimportant. If preferred, instead of employing a flexible pipe w I may employ pipe-sections $W^2$, jointed in the manner shown in Figs. 9, 10, and 12. As this form of joint is well known, it need not be described. The tub A is provided with roller-feet k, which support it when the tub is lowered. In some cases the overflow-pipe e may be dispensed with or replaced by a construction as shown in Figs. 9 and 14, in which the chamber C' is shown as somewhat wider than in the other figures of the drawings, and a chamber P is formed at the inner end of the tub, which communicates with the interior of the tub by an opening p' and with the chamber C' by an opening $p^2$. In some cases it may be convenient to place the bath in the corner of a room, in which case the cabinet may be constructed as indicated in Fig. 11.

As the construction is obvious, the details need not be described. It will be observed by reference to Fig. 8, for instance, that the outlet through the chamber C' is practically at the lowest point of this chamber when the bath is either in its elevated or lowered position. In this way the water that is let into the chamber C' will find its way to the waste-pipe whatever be the position of the tub. There is no possible danger of the overflowing of the tub, and the latter may be fully drained even when retained in a horizontal position, so that it is not necessary to lift the tub in order to empty it. Preferably I employ a drip-pan X, located within the cabinet below the tub a sufficient distance therefrom to allow of the tub being raised and lowered freely.

I claim as my invention—

1. The combination of a supporting-frame, a tub having a curved inner end arranged close to the wall in rear of the tub when it is lowered, a water-supply faucet overhanging the curved end of the tub both when it is raised and lowered, a pivotal connection between the sides of the tub and the supporting-frame whereby the tub may be raised to a vertical position or lowered to a horizontal position, a waste-opening in the bottom of the tub through which water may be discharged when the tub is lowered or in a horizontal position, a waste-pipe and a flexible connection between the waste-pipe and the waste-opening in the tub.

2. The combination of a supporting-frame, a tub having a curved inner end arranged close to the wall in rear of the tub when it is lowered, a water-supply faucet overhanging the curved end of the tub both when it is raised and lowered, a pivotal connection between the sides of the tub and the supporting-frame whereby the tub may be raised to a vertical position or lowered to a horizontal position, a chamber located at the lower portion of the inner end of the tub and communicating with the tub through an opening in the bottom thereof whereby water may flow from the tub to said chamber when the tub is in a horizontal position, a waste-pipe and a flexible connection between said waste-pipe and said chamber.

3. The combination with a frame or cabinet, of a tub having a curved inner end arranged close to the rear wall of the frame or cabinet and which has a pivotal connection with the frame or cabinet so that it may be raised and lowered, a chamber located at the lower portion of the inner end of the tub and communicating with the tub through an opening in the bottom thereof, an overflow-pipe connecting the tub with said chamber, a waste-pipe and a flexible connection between said chamber and the waste-pipe.

4. The combination with a frame or cabinet, of a tub having a curved inner end arranged close to the rear wall of the frame or cabinet, and which has a pivotal connection with the frame or cabinet so that it may be raised and lowered, a chamber located at the lower portion of the inner end of the tub and communicating with the tub through an opening in the bottom thereof, an overflow-pipe connecting the tub with said chamber, a waste-pipe and a flexible connection between the waste-pipe and said chamber near its lower rear end whereby a connection is maintained between said chamber and the waste-pipe whatever be the position of the tub.

5. The combination with a frame or cabinet, of a tub having a curved inner end arranged close to the rear wall of the frame or cabinet and which has a pivotal connection with the frame or cabinet so that it may be raised and lowered, a supply-faucet above the inner end of the tub close to its introverted portion and which extends over the curved inner end of the tub when the latter is elevated, a waste-chamber at the lower portion of the inner end of the tub which communicates with the tub through a waste-opening in the bottom thereof when the tub is lowered, a waste-pipe and a flexible connection between the waste-pipe and the waste-chamber.

6. The combination with a tub, of a cabinet with which the tub is pivotally connected, which comprises a back piece, stationary lower side pieces and a bottom connected with the stationary back and an upper portion comprising a front piece, side pieces and a top connected to and moving with the tub and a hinged front piece for the lower section of the cabinet.

7. A bath-tub having a curved introverted end, a chamber located at the lower portion of the inner end of the tub and communicating with the tub through an opening in the bottom thereof, an overflow connecting the tub with said chamber, a waste-pipe and a flexible connection between said chamber and waste-pipe.

In testimony whereof I have signed my name to this specification in the presence of two subscribing witnesses.

EDWARD W. LANCASTER.

Witnesses:
 T. E. HALFORD,
 G. NEWBERY.